United States Patent
Cha

(10) Patent No.: US 7,860,109 B2
(45) Date of Patent: Dec. 28, 2010

(54) HOST DEVICE INTERFACING WITH A POINT OF DEPLOYMENT (POD) AND A METHOD OF PROCESSING BROADCAST DATA

(75) Inventor: Sang Hoon Cha, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 12/219,856

(22) Filed: Jul. 29, 2008

(65) Prior Publication Data

US 2009/0059927 A1 Mar. 5, 2009

Related U.S. Application Data

(60) Provisional application No. 60/952,847, filed on Jul. 30, 2007.

(30) Foreign Application Priority Data

Oct. 16, 2007 (KR) .................... 10-2007-0103949

(51) Int. Cl.
*H04L 12/28* (2006.01)
(52) U.S. Cl. .................... 370/395.5; 370/465; 370/537
(58) Field of Classification Search ......... 370/389–392, 370/395.5, 395.52, 395.6–395.65, 465–466
See application file for complete search history.

(56) References Cited

U.S. PATENT DOCUMENTS

| | | | |
|---|---|---|---|
| 2005/0177845 A1 | 8/2005 | Patariu et al. | |
| 2007/0074256 A1 | 3/2007 | Jung et al. | |
| 2007/0250872 A1 * | 10/2007 | Dua ........................... | 725/81 |

FOREIGN PATENT DOCUMENTS

EP 1748645 A2 1/2007

OTHER PUBLICATIONS

DOCSIS Set-top Gateway (DSG) Interface, SP-DSG-I01-020228, 35 pages, Feb. 2002.*
Jung et al, Design and Implementation of a Multi-stream CableCARD with a High-Speed DVB-Common Descrambler, ACM, 4 pages, Oct. 2006.*
"OpenCable Specifications—Multi-Stream CableCARD Interface", 20050331, (Mar. 2005), XP002507410, Cahp 1, pp. 1-3; Chap 3, pp. 10-15, Sec 4.1.5, pp. 22-25, Sec. 6.15, pp. 81-82, Sec. 7.2.3., p. 122.
Joon-Young Jung et al., "Design and Implementation of a High-Speed Descrambling Engine for Multi-Stream CableCARD", IEEE Transactions on Consuimer Electronics, IEE Service Center, NY, NY, vol. 53, No. 1 (2007) pp. 166-171), XP011175938, §§ I, II, pp. 166-167, Figs. 1-4.

* cited by examiner

*Primary Examiner*—Frank Duong
(74) *Attorney, Agent, or Firm*—McKenna Long & Aldridge LLP

(57) ABSTRACT

A host device interfacing with a point of deployment (POD) and a method of processing a broadcasting data are disclosed. A broadband interface unit received a MPEG transport packet through a cable. A demodulator demodulates the received MPEG transport packet. An IP physical interface unit for received a frame including an internet protocol (IP) packet through a network. A routing engine transforms the frame to an IP packet and routs the IP packet based on a destination information included in the frame. And a multiplexer generates IP MPEG packet and CableCARD MPEG packet by appending a Packet Header carrying identification information and packet identification information to each of the IP packet and the demodulated MPEG transport packet, multiplexes the IP MPEG packet and the CableCARD MPEG packet and sends the multiplexed IP MPEG packet and CableCARD MPEG packet to the POD.

20 Claims, 14 Drawing Sheets

FIG. 5

| Routing Index | LTSID | Routing Dest. | Format |
|---|---|---|---|
| QAM Cable Index 1 | 1 | Decoder | MPEG TS |
| QAM Cable Index 2 | 2 | Flash | MPEG TS |
| IP Index 1 | 3 | Decoder | MPEG TS |
| IP Index 2 | 4 | HDD | MPEG TS over IP |

HOST DEVICE INTERFACING WITH A POINT OF DEPLOYMENT (POD) AND A METHOD OF PROCESSING BROADCAST DATA

This application claims the benefit of U.S. Provisional Application No. 60/952,847, filed on Jul. 30, 2007 which is hereby incorporated by reference as if fully set forth herein. Also this application claims the benefit of Korean Patent Application No. 10-2007-103949, filed on Oct. 16, 2007 which is hereby incorporated by reference as if fully set forth herein.

BACKGROUND OF THE INVENTION

1. Field of the Invention

The present invention relates to a host device interfacing with a Point Of Deployment (POD) and a method of processing broadcast data, and more particularly, to a host device for processing broadcast data transmitted on the basis of an Internet protocol (IP) and a method of processing broadcast data transmitted on the basis of an Internet protocol (IP).

2. Discussion of the Related Art

Existing television (TV) services have been provided in such a manner that contents produced by broadcasting companies are transmitted through radio transmission media, such as terrestrial waves, cables or satellites, and a viewer watches the transmitted contents through a TV receiver capable of receiving the transmitted contents via the respective transmission media.

However, as digital TV technologies based on digital broadcasting are developed and are commercially available, breaking from existing analog broadcasting, various contents, such as real-time broadcasts, Contents on Demand (CoD), games and news, can be provided to a viewer using the Internet network connected to each home, besides the existing transmission media.

An example of the provision of contents using the Internet network may include an Internet Protocol TV (IPTV) The IPTV indicates a broadcast receiver for receiving various types of information services, moving-image contents and broadcasts using an Internet network and displaying them to a user. The Internet network can be implemented on the basis of various types of networks such as optical cable networks, coaxial cable networks, fiber-to-the-home (FTTH), telephone networks and wireless networks.

The service using the Internet network additionally has bidirectionality and enables a viewer to watch a desired program at his/her convenient time, unlike general terrestrial broadcasting.

SUMMARY OF THE INVENTION

Accordingly, the present invention is directed to a host device interfacing with a point of deployment (POD) and a data processing method for use in the host device that substantially obviate one or more problems due to limitations and disadvantages of the related art.

An object of the present invention is to provide a host device interfacing with a point of deployment (POD) which can process data received via the Internet, and a data processing method for use in the host device.

Another object of the present invention is to provide a host device interfacing with a point of deployment (POD) which can process broadcast data, received from all the Tx protocols including both a wired/wireless network and an IP protocol, using a conditional access provided from a conventional cable card, and a data processing method for use in the host device.

Another object of the present invention is to provide a host device interfacing with a point of deployment (POD) which can receive broadcast data from a Multimedia over Coax Alliance (MoCA), and a data processing method for use in the host device.

Another object of the present invention is to provide a host device interfacing with a point of deployment (POD) which can process Inband data received over the Internet, and a data processing method for use in the host device.

Another object of the present invention is to provide a host device interfacing with a point of deployment (POD) which can process Inband data received over the Internet and another Inband data based on another Rx scheme, and a data processing method for use in the host device.

Another object of the present invention is to provide a host device interfacing with a point of deployment (POD) which allow first Inband data received over the Internet to have the same structure as that of second Inband data based on another Rx scheme, such that the first and second Inband data interfaces with the host and the security card, and a data processing method for use in the host device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing broadcast data includes receiving a frame including an internet protocol (IP) packet through a network and a MPEG transport packet through a cable; transforming the frame to an IP packet and routing the IP packet based on a destination information included in the frame; demodulating the received MPEG transport packet; generating an IP MPEG packet and a Cable-CARD MPEG packet by appending a Packet Header carrying identification information and packet identification information to each of the IP packet and the demodulated MPEG transport packet; and multiplexing the IP MPEG packet and the CableCARD MPEG packet and sending the multiplexed IP MPEG packet and CableCARD MPEG packet to a point of deployment (POD). Herein destination information is at least one of a MAC address, an IP address and a Port Number. And the IP packet carries at least one of a video, an audio and a service information. And the identification information is a local transport stream ID (LTSID). And the packet identification information is information for identifying an IP MPEG packet or a CableCARD MPEG packet.

Also, the frame is an Ethernet frame including an Ethernet header, an IP packet and an Ethernet CRC. Herein transforming the frame to an IP packet includes removing the Ethernet header and the Ethernet CRC from the frame.

Also, generating IP MPEG packet includes determining the identification information with respect to the IP packet. Herein the identification information is determined based on at least one of an IP address and a Port number included in the IP packet.

Also, the method further includes receiving a packet from the POD and detecting whether the received packet is an IP MPEG packet or a CableCARD MPEG packet based on packet identification information included in the packet.

In another aspect of the present invention, A method of processing broadcast data includes receiving a packet from a host; detecting whether the received packet is an IP MPEG packet or a CableCARD MPEG packet based on packet identification information included in the packet; descrambling data carried within a payload field included in the detected packet; and sending the packet to the host. Herein the packet identification information is carried within Packet Header included in the packet.

In another aspect of the present invention, A host device interfacing with a point of deployment (POD) includes a broadband interface unit for receiving a MPEG transport packet through a cable; a demodulator for demodulating the received MPEG transport packet; an IP physical interface unit for receiving a frame including an internet protocol (IP) packet through a network; a routing engine for transforming the frame to an IP packet and routing the IP packet based on a destination information included in the frame; and a multiplexer for generating IP MPEG packet and CableCARD MPEG packet by appending a Packet Header carrying identification information and packet identification information to each of the IP packet and the demodulated MPEG transport packet, multiplexing the IP MPEG packet and the CableCARD MPEG packet, and sending the multiplexed IP MPEG packet and CableCARD MPEG packet to the POD. Herein the destination information is at least one of a MAC address, an IP address and a Port Number. And the IP packet carries at least one of a video, an audio and a service information. And the identification information is a local transport stream ID (LTSID). And the packet identification information is information for identifying an IP MPEG packet or a CableCARD MPEG packet.

Also the frame is an Ethernet frame including an Ethernet header, an IP packet and an Ethernet CRC. Herein the routing engine removes the Ethernet header and the Ethernet CRC from the frame.

Also the multiplexer determines the identification information with respect to the IP packet. Herein the multiplexer determines the identification information based on at least one of an IP address and a Port number included in each of the IP packet.

Also the host further includes a demultiplexer for receiving a packet from the POD and detecting whether the received packet is an IP MPEG packet or a CableCARD MPEG packet based on packet identification information included in the packet.

Therefore, the present invention can perform content protection using the conditional access provided from the conventional cable card. Therefore, the service provider or the service enterprise can perform the above content protection, and can stably charges a usage fee to a service user using the conditional access.

The present invention processes broadcast data received from all the transfer protocols including both the wired/wireless network and the IP protocol, such that it interfaces with the openCable security card. A service subscriber or a service user minimally changes or extends a function of the conventional cable security card, such that the subscriber or user is able to view data of a desired service provider.

The present invention allows Inband data, transmitted on all the transfer protocols including the wired/wireless network and the IP protocol, to maintain the IP packet format, such that IP-packet format Inband data is transmitted to the security card. As a result, the host can effectively communicate with the security card.

The present invention maintains the interface of the Inband interface of the conventional openCable card, such that it can support both the Inband data received over the Internet or other Inband data received over other Inband channels. As a result, the present invention can acquire a backward compatibility with a conventional system.

The present invention receives not only first Inband data transmitted on all the transfer protocols including the wired/wireless network and the IP protocol, but also second Inband data based on another Rx scheme, and implements the interface between the host and the card under the data structure based on the same IP packet, such that it can effectively process Inband data having various transmission schemes and paths.

The present invention can receive broadcast data from a multimedia over Coax Alliance (MoCA), such that an seamless IP-based connectivity can be implemented on a coaxial network, resulting in the implementation of an IP over Coax.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a structural diagram illustrating a Local Transport Stream ID (LTSID) table according to one embodiment of the present invention;

DETAILED DESCRIPTION OF THE INVENTION

Figure 1:
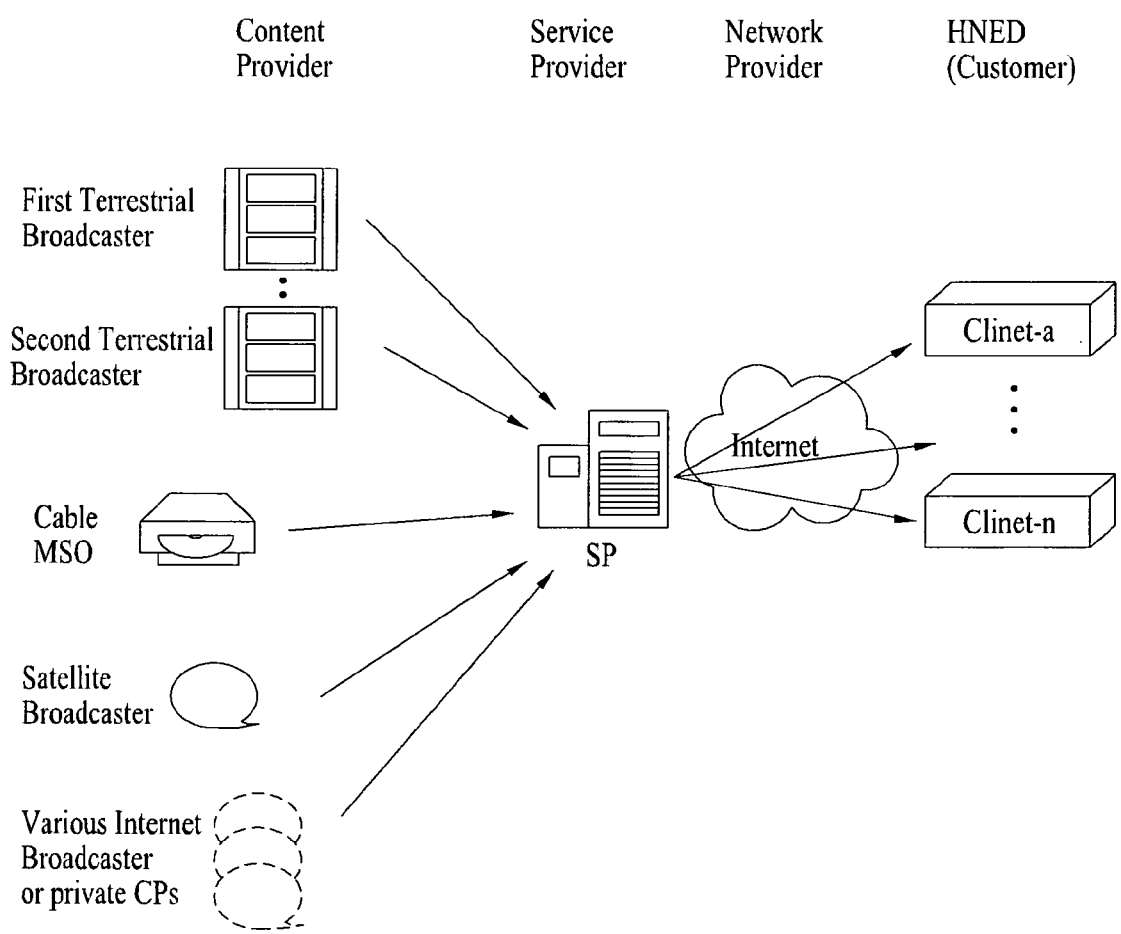
FIG. 1 is a conceptual diagram illustrating an IPTV system according to one embodiment of the present invention.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

A broadcast receiver and a method of processing broadcast data according to the present invention will be described in detail with reference to the accompanying drawings.

An Internet protocol TV (IPTV) system which is an example of a system capable of providing various types of contents using an Internet network may be largely divided into a server, a network and a broadcast receiver (client).

The server of the IPTV system may include servers having various functions, such as a service discovery and selection server, a streaming server, a content guide information server, a customer information server, and a payment information server.

Among these servers, the streaming server transmits stored Moving Picture Experts Group (MPEG)-2 or MPEG-4 encoding moving-image data to the broadcast receiver via a network. As a transmission protocol, a real-time transport protocol (RTP) or a RTP control protocol (RTCP) may be used.

In the case where a real-time streaming protocol (RTSP) is used, the reproduction of a moving-image stream can be controlled by a network trick play function such as Pause, Replay, Stop or the like to some extent.

The content guide information server provides information on provided various contents. The content guide information includes a variety of information on the contents as information corresponding to electronic program guide (EPG) information. The content guide information server stores content guide information data and provides the stored data to the broadcast receiver.

Among the servers, the service discovery and selection server provides access information of servers for providing various types of content services such as broadcasts, Contents on Demand (CoD) or games and reproduction information to the broadcast receiver.

A network system includes an Internet-based network and gateways. As the Internet-based network, various types of networks based on the IP, such as optical cable networks, coaxial cable networks, fiber-to-the-home (FTTH), telephone networks and wireless networks, may be used. The gateways may generally perform data delivery, multicast group management using a protocol such as an Internet Group Management Protocol (IGMP) and Quality of Service (QoS) management.

The IPTV indicates a broadcast receiver capable of receiving data transmitted via the Internet network and providing the data to a user. The broadcast receiver may include an IPTV settop, a homenet gateway and an IPTV embedded TV.

A hybrid IPTV system can provide various types of contents of the Internet as well as various types of existing broadcast contents. That is, besides various types of broadcast contents such as terrestrial broadcasting, cable broadcasting, satellite broadcasting or private broadcasting, various Internet image contents or data contents other than images can be provided to the user. These contents may be provided in real time or on demand.

FIG. 1 is a schematic view showing an IPTV system according to an embodiment of the present invention.

From the viewpoint of a content service provider, the IPTV system may be divided into a content provider (CP), a service provider (SP), a network provider (NP) and a user.

The CP manufactures and provides various types of contents. The CP may include a terrestrial broadcaster, a cable system operator (SO) or a cable multiple system operator (MSO), a satellite broadcaster and an Internet broadcaster.

The SP packages contents provided by the CP to a service and provides the service. For example, the SP of FIG. 1 packages a first terrestrial broadcast, a second terrestrial broadcast, a cable MSO broadcast, a satellite broadcast, various Internet broadcasts to the service and provides the service to the user.

As means for protecting the contents transmitted in the IPTV system, conditional access or content protection may be used. As an example of the conditional access or the content protection, a cable card or a downloadable conditional access system (DCAS) may be used.

The use of the security card or the DCAS is selected by the SP for providing the IPTV service. In the case where the security card or the DCAS is used in the broadcast receiver, the SP communicating with the broadcast receiver should use that system.

Figure 2:
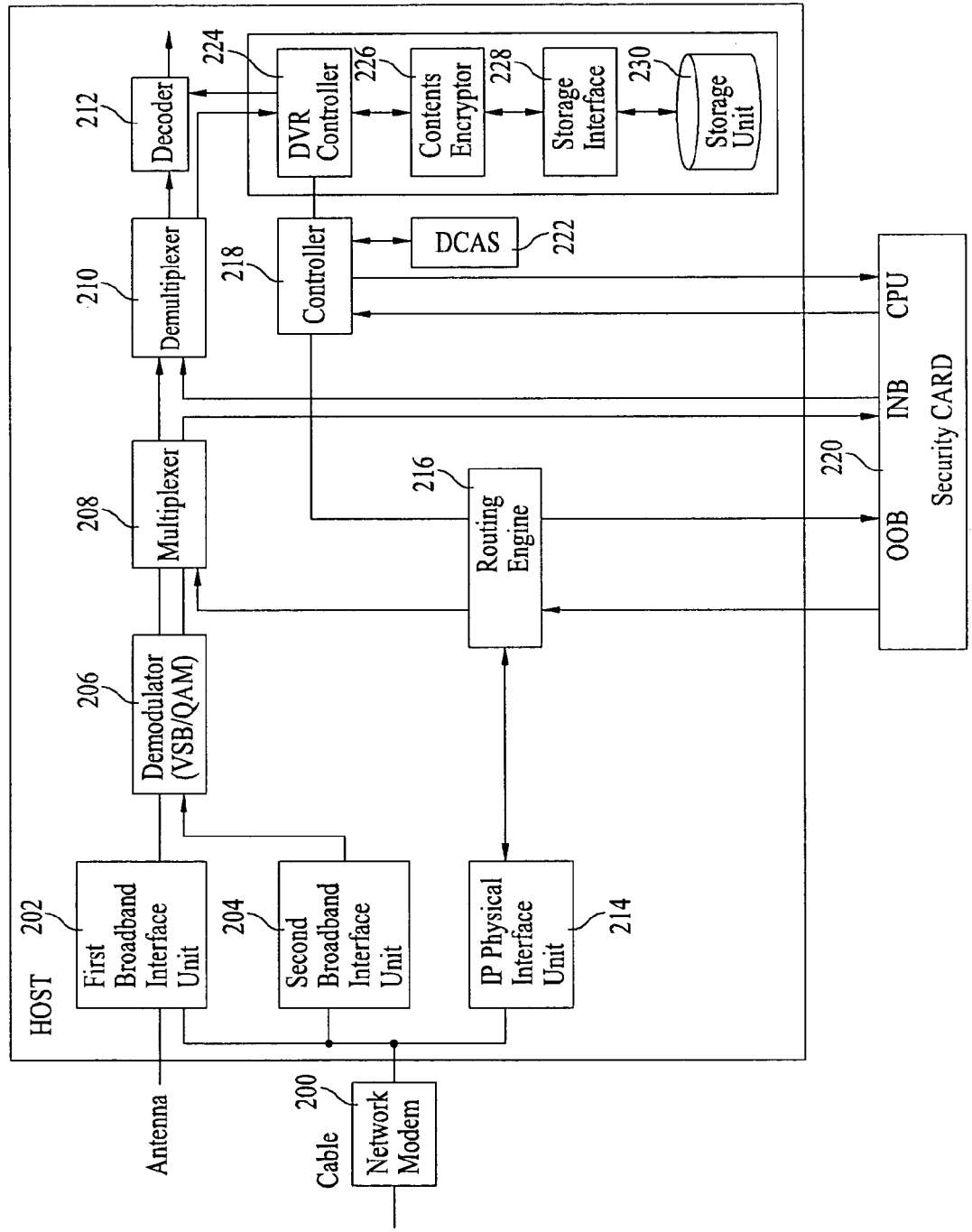
FIG. 2 is a block diagram illustrating a receiver for use of a cable card according to one embodiment of the present invention.

FIG. 2 is a schematic block diagram showing a broadcast receiver using the security card according to an embodiment of the present invention.

The broadcast receiver of FIG. 2 can receive all of an IPTV service based on the IP, a cable broadcast, a terrestrial broadcast and a satellite broadcast. The broadcast receiver of FIG. 2 may receive only the IPTV service or cable broadcasting according to the implementation examples. The security card of FIG. 2 may be called other terms according to the implementation examples.

The receiver of FIG. 2 mainly includes a host and a security card. The host includes a first broadband interface unit 202, a second broadband interface unit 204, a demodulator 206, a multiplexer 208, a demultiplexer 210, a decoder 212, an IP physical interface unit 214, a routing engine 216, a controller 218, a Downloadable CAS (DCAS) unit 222, a Digital Video Recorder (DVR) controller 224, a contents encryptor 226, a storage interface unit 228, and a storage unit 230.

The broadcast receiver is an open cable type receiver in which the security card including a conditional access system (CAS) can be detached from a main body. The security card is also called a point of deployment (POD) module, which is inserted into or detached from a slot of the main body of the broadcast receiver. The main body into which the security card is inserted is also called a host device. That is, a combination of the security card and the host device is called the broadcast receiver.

The host device included in the broadcast receiver of FIG. 2 is one example implemented by a multi stream host device capable of simultaneously processing a plurality of streams. When a host device is implemented by a single stream host device capable of processing only one stream, it is bypassed for multiplexer 208 and the demultiplexer 210 of the host device of FIG. 2 to generate a CableCard MPEG Packet (CMP) and an IP MPEG Pacek (IMP) by appending a Packet Header to a MPEG transport packet and multiplex the CMP and the IMP and demultiplex the multiplexed CMP and IMP. But, though a host device is implemented a single stream host device, the other operations that the present invention disclose are performed identically. Also, the single-stream card capable of processing only one stream may be used as the security card 220, or the multi-stream card capable of simultaneously processing several streams may also be used as the security card 220.

A network modem 200 connects an external network and the broadcast receiver. For example, the broadcast receiver may be connected to the external network using a data over cable service interface specification (DOCSIS) modem, a wireless repeater connected to a wireless Internet network, or a wired repeater connected to a wired Internet network, such as a wired Asymmetric Digital Subscriber Line (ADSL) repeater. The example of the connection between the broadcast receiver and the external network is only exemplary and may vary depending on how the broadcast receiver is connected to the external network.

In the case where the network modem 200 is implemented by the DOCSIS modem, the broadcast receiver according to the present invention may be connected to a DOCSIS network. That is, the network modem 200 may build a cable modem termination system (CMTS) (DSG agent) and a DSG tunnel for delivering a data broadcast received from a set-top controller (DSG server) via the DOCSIS network and receive broadcast data via the built DSG tunnel. Here, the DOCSIS network may be implemented by an IP backbone network and support IP multicast/unicast.

However, in order to support the IP multicast/unicast via the DOCSIS network, a packet received from the CMTS (DSG agent) should be transformed to a DSG packet and the DSC packet should be transmitted. Accordingly, the broadcast receiver cannot be directly connected to the external IP network so as to receive the broadcast data.

In order to solve these problems, the network modem 200 may provide a function for directly connecting the broadcast receiver to the external IP network. For example, the network modem 200 may be implemented by a Multimedia over Coax Alliance (MoCA). In the case where the network modem 200 is implemented by the MoCA, the IP-based network may be established and connected over a coaxial cable network. That is, in the case where the network modem 200 is implemented by the MoCA, the DOCSIS may not be used, the DOCSIS modem does not need to be used, and the CMTS connected to the DOCSIS modem over the network does not need to be used. In addition, the DSG tunnel established between the DOCSIS modem and the CMTS does not need to be used. Accordingly, since seamless IP-based connectivity may be implemented over the coaxial network, the broadcast receiver according to the present invention can use IP over Coax and thus provide a rapid stable broadcast service to the user.

The first broadband interface unit 202 tunes to only a specific channel frequency of terrestrial audio/video (A/V) broadcasting transmitted via an antenna or cable A/V broadcasting transmitted in-band via a cable connected to the network modem 200, and outputs the tuned signal to the demodulator 206.

At this time, since the terrestrial broadcast and the cable broadcast are transmitted by different transmission methods, they are demodulated by different demodulation methods in the demodulator 206. For example, while the terrestrial A/V broadcast is modulated by a vestigial sideband modulation (VSB) method, the cable A/V broadcast is modulated by a quadrature amplitude modulation (QAM) method. Therefore, if the channel frequency tuned by the first broadband interface unit 202 is the terrestrial broadcast, the demodulator 206 demodulates the terrestrial broadcast by the VSB method and if the channel frequency tuned by the first broadband interface unit 202 is the cable broadcast, demodulates the cable broadcast by the QAM method.

The second broadband interface unit 204 tunes to only a specific channel frequency of cable A/V broadcast transmitted in-band via the cable connected to the network modem 200, and outputs the tuned signal to the demodulator 206.

The first broadband interface unit 202 and the second broadband interface unit 204 may tune the signals of different channels and transmit the signals to the demodulator 206. Alternatively, the first broadband interface unit 202 and the second broadband interface unit 204 may tune different A/V streams of the same channel and transmit the signals to the demodulator 206. For example, the first broadband interface unit 202 may tune a stream of a main picture and the second broadband interface unit 204 may tune a stream of a picture in picture (PIP). In the case where a digital video signal is stored in a digital video recorder (DVR), the video signal may be watched and recorded using the first broadband interface unit 202 and the second broadband interface unit 204.

The demodulator 206 demodulates the received signal and transmits the demodulated signal to the multiplexer 208. For example, an MPEG TS (Transport Stream) stream which is encoded by an MPEG encoding scheme (e.g., MPEG 2 or MPEG 4) is transmitted to the multiplexer 208. Or a stream which is encoded by other encoding schemes is transmitted to the multiplexer 208. The received signal is different according to the encoding schemes by which the received signal is encoded.

IP physical interface unit 214 acts as a network interface unit. The IP physical interface unit 214 receives an Ethernet frame packet transmitted to a specific IP address from among addresses received via the network modem 200, and transmits the received Ethernet frame packet to the routing engine 216. Otherwise, the IP physical interface unit receives bi-directional data (e.g., pay-per-view program application, receiver status information, and user input information) from the routing engine 216, and transmits the received bi-directional data to an external network via the network modem 200. The IP address may be an IP address of a host or an IP address of a security card.

The receiver of FIG. 2 may receive IP protocol-based OOB (Out Of Band) message data or Inband data including audio, video, and data broadcast data from the IP physical interface unit 214.

The conventional cable broadcasting system receives OOB data using a DOCSIS Settop Gateway (DSG) or OOB scheme, for example, System Information (SI), Emergency Alert System (EAS), extended Application Information Table (XAIT), conditional access system information, and various security card control information.

A host of the receiver of FIG. 2 may include a DOCSIS modem or an OOB tuner, such that it may receive the OOB data. For example, the receiver may receive the OOB data using one of the IP scheme and the OON scheme. Otherwise, the receiver may receive the OOB data using one of the IP scheme, the DSG scheme, and the OOB scheme.

If the receiver selects one of the IP scheme and the OOB scheme and receives OOB data under the selected scheme, the receiver of FIG. 2 further requires the OOB tuner and the demodulator. If the receiver of FIG. 2 receives one of the IP scheme, the DSG scheme and the OOB scheme, and receives OOB data under the selected scheme, the receiver further requires the DOCSIC modem, the OOB tuner, the switching unit for selecting the DSG or OOB scheme, and the demodulator for transmitting data to the headend or the service provider according to individual schemes. If there are a plurality of schemes, the headend determines which one of schemes will be used, and transmits the determined result to the security card. The security card transmits the received operation scheme information to the host.

For the convenience of description, the path and block of the DSG scheme of the DOCSIS modem or the path and block of the OOB scheme of the OOB tuner are omitted from the receiver of FIG. 2.

The routing engine 216 routes each Rx packet to a destination of the Rx packet. For example, the routing engine 216 may route the packet the above packet to the destination using a TCP/IP (Transmission Control Protocol/Internet Protocol)-based network stack. The routing engine 216 can support both the TCP/IP protocol and the UDP (User Datagram Protocol)/IP protocol. Also, the routing engine 216 may discriminate between Inband data and OOB data using packet header information, and may perform jitter filtering.

Figure 3:
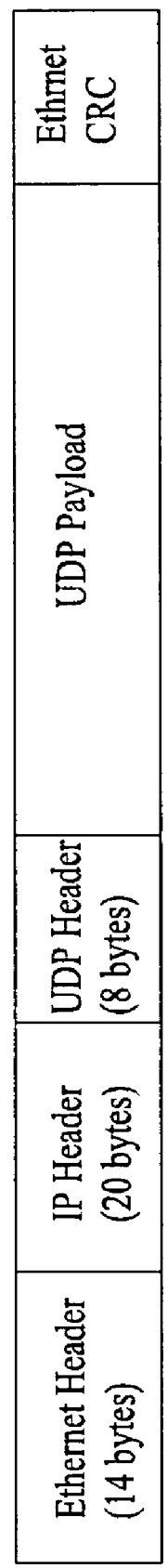
FIG. 3 is a structural diagram illustrating an Ethernet frame according to one embodiment of the present invention.

FIG. 3 is a structural diagram illustrating an Ethernet frame according to one embodiment of the present invention. The routing engine 216 receives the Ethernet frame having the structure of FIG. 3. The frame includes an Ethernet header of 14 bytes, an IP header of 20 bytes, a UDP header of 8 bytes, a payload, and an Ethernet CRC (Cyclic Redundancy Check). If data is transmitted according to the TCP protocol instead of the UDP protocol, a TCP header may be used instead of the UDP header, and a TCP payload on behalf of the UDP header may be contained in the Ethernet frame, such that the above-mentioned payload may include Inband data or OOB data.

The routing engine 216 divides the Rx data of FIG. 3 into the Inband data and the OOB data, and performs routing of the inband and OOB data. In order to distinguish the Inband data from the OOB data, the routing engine 216 may use the header information made by an agreement between a transmission end and a reception end. The Inband data and the OOB data may be routed to a data destination using a second layer routing, a third layer routing, or a fourth layer routing.

In the case of using the second layer routing, the routing engine 216 performs the routing using a destination Media Access Control (MAC) address contained in an Ethernet header of the received Ethernet frame. In the case of using the third layer routing, the routing engine 216 performs the routing using the destination IP address contained in the IP header of the received Ethernet frame. In the case of using the fourth layer routing, the routing engine 216 performs the routing using the destination port contained in the UDP header of the received Ethernet frame. If the Ethernet frame includes the TCP header, the routing engine 216 performs the routing using the destination TCP port. The routing engine 216 may determine whether to use the second layer routing, the third layer routing, or the fourth layer routing according to individual implementation examples. In other words, the routing engine 216 may use the second layer routing, the third layer routing, or the fourth layer routing according to individual implementation examples.

For example, in the case of using the second layer routing, the Ethernet header of host's data contained in the Rx data includes MAC address information. In the case of using the third layer routing, the IP address of host's data contained in the Rx data includes host's IP address information. In the case of using the fourth layer routing, a UDP header or a TCP header of host's data contained in the Rx data includes a port number.

In the Rx data of the routing engine 216, Inband data including audio-, video-, and data broadcast-data is routed to the IP-to-TS decapsulator 218. The Inband data may be an MPEG TS stream encoded by an MPEG encoding scheme (e.g., MPEG 2 or MPEG 4). The Inband data may be a stream encoded by other encoding schemes.

Figure 4:
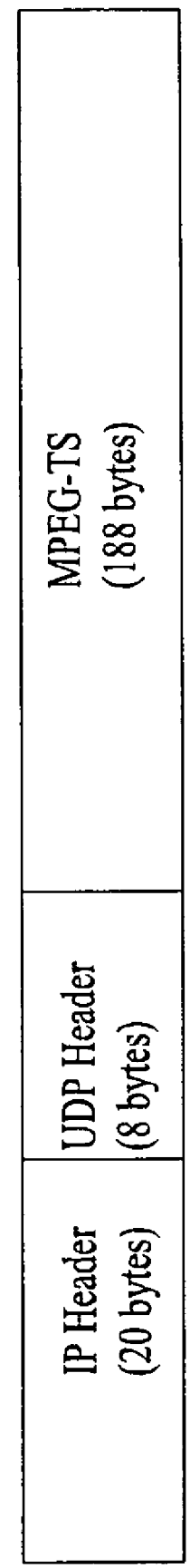
FIG. 4 is a structural diagram illustrating data routed to a multiplexer according to one embodiment of the present invention.

FIG. 4 is a structural diagram illustrating data routed to the multiplexer 208 according to one embodiment of the present invention. The data structure of FIG. 4 may include a payload and an MPEG-TS encoded by the MPEG scheme. The routing engine 216 transmits data other than both the Ethernet header and the Ethernet CRC in the received Ethernet frame to the multiplexer 208. Data having the data structure of FIG. 4 will hereinafter be referred to as an IP packet.

According to host implementation examples, the IP packet including A/V data of several channels can be simultaneously received. Therefore, the multiplexer 208 assigns the LTSID to each data contained in IP packets of different channels, and multiplexes the resultant data. In this case, the LTSID is indicative of identification information for identifying corresponding stream data. For example, if the multiplexer 208 receives the IP packet of FIG. 4, the LTSID mapped to each MPEG-TS may be assigned to the received IP packet using the routing index information engaged with either a server for data transmission or a headend. The security card classifies data using the above-mentioned LTSID, and may perform CA descrambling of the classified data. The host can correctly route data using the LTSID. In this case, the routing index information may be received via the server or the headend. Also, the routing index information may include an IP address list or a port list, and may also include another list associated with the IP address and associated ports.

FIG. 5 is a structural diagram illustrating a Local Transport Stream ID (LTSID) table according to one embodiment of the present invention. Based on the LTSID table of FIG. 5, the present invention can simultaneously discriminate between the IP packet data of each Rx channel based on the IP and the Inband data of a cable broadcast channel. Also, the present invention can generate and modify the above-mentioned LTSID table using the routing index information.

Referring to FIG. 5, QAM Cable index may be used to discriminate the A/V data stream received over a quadrature amplitude modulation (QAM) channel of the cable broadcast channel. For example, if the receiver can receive data of several cable broadcast channels via several tuners, it may assign the LTSID to each tuner. As shown in FIG. 2, in order to identify the A/V data stream received in the first broadband interface unit 202, the QAM Cable index 1 (LTSID 1) may be assigned. In order to identify the A/V data stream received in the second broadband interface unit 204, QAM Cable index 2 (LTSID 2) may be assigned.

The IP index may be used to identify the IP packet data corresponding to each channel data received via the IP network channel. In order to identify the above IP packet data, a variety of methods for assigning the LTSID can be used. In this case, the IP index can be calculated from the routing index information.

Firstly, the receiver may assign the LTSID using the IP address information contained in the IP header of the IP packet received in the multiplexer 208. In other words, if several IP addresses are used as the IP index, different LTSIDs may be assigned to the IP addresses. Therefore, the receiver may discriminate Rx data for each IP address. For example, the IP index 1 (LTSID 3) may be assigned to the IP packet received at the IP address (1.1.1.1) of the receiver, and the IP index 2 (LTSID 4) may be assigned to the IP packet received at another IP address (1.1.1.2) of the receiver. IPv4, IPv6, etc., can be applied to the IP address. The above-mentioned IP address has been used as an example only. However, information contained the IP header of either the frame or the packet may be changed according to the above IP address. In this case, the multiplexer 208 may set each IP address contained in the routing index information to the IP index, and assigns the LTSID to each IP address, such that the table of FIG. 4 can be generated and modified.

Secondly, the receiver may assign the LTSID using the port information contained in the UDP (or TCP) header of the IP packet received in the multiplexer 208. In other words, if several ports are used as the IP index, different LTSIDs may be assigned to the individual ports. Therefore, the receiver may discriminate Rx data for each port. For example, the IP index 1 (LTSID 3) may be assigned to the IP packet received at the No. 6 port of the receiver, and the IP index 2 (LTSID 4) may be assigned to the IP packet received at the No. 17 port of the receiver. The above-mentioned port number has been used as an example only. In this case, the multiplexer 208 may set each port contained in the routing index information to the IP index, and assigns the LTSID to each port, such that the table of FIG. 5 can be generated and modified.

Thirdly, the receiver may assign the LTSID using not only the IP address contained in the IP header of the IP packet received in the multiplexer 208, but also the port information contained in the UDP (or TCP) header. In other words, the IP index may include at least one of the IP address and its associated port. The receiver may assign the LTSID using the IP address and the port information. For example, the IP index 1 (LTSID 3) may be assigned to the No. 6 port-received IP packet from among all the IP packets received at the IP address (1.1.1.1), and the IP index 2 (LTSID 4) may be assigned to the No. 17 port-received IP packet from among all the IP packets received at the IP address (1.1.1.1). The IP index 3 (LTSID 5: not shown) may be assigned to the No. 6 port-received IP packet from among all the IP packets received at the IP address (1.1.1.2). In this case, the multiplexer 208 may set each IP address contained in the routing index information and a port associated with the IP address to the IP index, and assigns the LTSID to each IP address and port, such that the table of FIG. 5 can be generated and modified.

The routing destination (Routing Dest) of the LTSID table is indicative of a routing destination of the above data after the demultiplexing has been carried out by the demultiplexer 210. 'Format' of the LTSID table is indicative of a data format received at the destination when the demultiplexed data of the demultiplexer 210 is routed. For example, if data has the LTSID value of 1, this data is demultiplexed by the demultiplexer 210, and the demultiplexed data is routed to the decoder. The data format routed to the decoder is an MPEG-TS format. If data has the LTSID value of 4, this data is demultiplexed by the demultiplexer 210, and the demultiplexed data is routed to a storage unit (e.g., HDD). The aforementioned routing data format is configured in the form of an IP packet to which the IP header is added to the MPEG-TS as shown in FIG. 4.

The routing destination information and the format information can be established by user setup information when the LTSID is assigned. That is, the routing destination information and the format information can be modified by a variety of setup information.

The multiplexer 208 inserts the LTSID into Rx data of both the demodulator 206 and the routing engine 216. The Rx data may be multiplexed and the multiplexed data may be outputted. For example, the multiplexer 208 multiplexes a main image and a PIP image, and outputs the multiplexed resultant image. In this case, the main image is tuned by the first broadband interface unit 202, and the tuned resultant image is demodulated. The PIP image is tuned by the second broadband interface unit 204, and the tuned resultant image is demodulated. Otherwise, according to implementation examples, the above-mentioned multiplexed result may be multiplexed with the output signal of the routing engine 216, such that the resultant image may be generated from the multiplexer 208. If the MPEG2-based encoded data is received in the receiver via the tuner, the multiplexer 208 receives MPEG-TS data. If the IP-based encoded data is received in the receiver via the IP physical interface unit (NIC) 214, the multiplexer 208 receives the IP packet.

If the security card of the receiver is equal to the S-CARD capable of supporting a single stream, the host transmits Rx data to the security card without any change. Therefore, the multiplexer 208 or the demultiplexer 210 of FIG. 2 need not make an IMP or a CMP by attaching a local header to Rx data, and need not multiplex or demultiplex the IMP or the CMP. In other words, the multiplexing or demultiplexing process of the multiplexer 208 or the demultiplexer 210 shown in FIG. 2 is bypassed. However, although the single-stream host is used, other operations of the present invention can also be carried out in the same manner as in the multi-stream host. However, if the security card is an M-CARD capable of supporting the multi-stream, there is needed a process for multiplexing several stream data or demultiplexing the multiplexed resultant data. The above-mentioned multiplexing process adds a pre-header of 12 bytes to the stream data, and then multiplexes the resultant data. The pre-header is removed from the demultiplexing process.

The receiver of FIG. 2 is used when the M-CARD capable of supporting the multi-stream is used. If data is received in the multiplexer 208, the multiplexer 208 adds the pre-header to the data, multiplexes the added data, and outputs the multiplexed result. The pre-header includes the LTSID information. Rx data of the demodulator 206 is different from that of the routing engine 216. For example, the demodulator 206 may receive MPEG-TS data. The multiplexer 208 may receive the IP packet data of FIG. 4 from the routing engine 216. The multiplexer 208 discriminates the Rx data, adds the pre-header to the resultant data, and transmits the added result to the security card.

The multiplexer 208 outputs terrestrial broadcast data (i.e., data requiring no CA descrambling) to the demultiplexer 210. Other data requiring the CA descrambling (e.g., cable broadcast data or the IPTV Inband data) is transmitted to the security card 220.

The security card 220 includes a conditional access (CA) system, such that the copy prevention and the conditional access of high value-added broadcast content data can be implemented. This security card 220 may also be called a point of deployment (POD). In other words, the security card 220 descrambles Rx broadcast data, and outputs the descrambled broadcast data to the demultiplexer 210 of the host. If there is no security card 220, the output data of the multiplexer 208 is directly transmitted to the demultiplexer 210. In this case, the scrambled broadcast data cannot be descrambled, such that a user is unable to normally view the above broadcast data.

The demultiplexer 210 demultiplexes data received from the security card. The demultiplexer 210 processes the demultiplexed data using the LTSID contained in the pre-header. For example, packet data including a specific LTSID is transmitted to the decoder 212, such that the decoder 212 decodes the received data. Other packet data including another LTSID may be stored in the storage unit 230 using a Digital Video Recorder (DVR). The decoder 212 recovers the A/V signal compressed by both the video decoding algorithm and the audio decoding algorithm, and outputs the recovered A/V signal.

The DVR controller 224, the contents encryptor 226, the storage interface 228, and the storage unit 230 store the received digital data, output the stored data, and reproduce the same data. Upon receiving a control signal from the controller 218, the DVR controller 224 stores video data selected from the output data of the demultiplexer 210, or reproduces video data selected from the stored data. The contents encryptor 226 performs encryption of data to be stored, and outputs the encrypted data. Otherwise, the contents encryptor 226 recovers the encrypted data, and outputs the recovered data. The contents encryptor 226 may not be used according to implementation examples. The storage interface 228 transmits/receives data to/from the storage unit 230, such that it acts as a data I/O interface with the storage unit 230. The storage unit 230 stores the received data.

DCAS unit 222 downloads the conditional access system (CAS) from the transmission-end server, and stores the downloaded CAS. The DCAS unit 222 performs the conditional access (CA) function according to an appropriate CA system from among the stored CA systems. The controller 218 controls an interface between the host and the security card and the data processing function of the above host.

In the case of the above-mentioned receiver, the interface type between the host and the security card can be changed according to Tx/Rx data communicated between the host and the security card. Next, a variety of embodiments of the above-mentioned interface between the host and the security card and Tx/Rx data communicated between the host and the security card will hereinafter be described.

The receiver according to a first embodiment can allow IMP (IP MPEG Packet)-format data to be communicated between the host and the security card. The above-mentioned IP packet is constructed by adding the pre-header of 12 bytes to the IP packet header of FIG. 4. However, the above term has been disclosed for only illustrative purposes, and the scope and spirit of the present invention are not limited to only this term and can also be applied to other examples as necessary.

Figure 6:
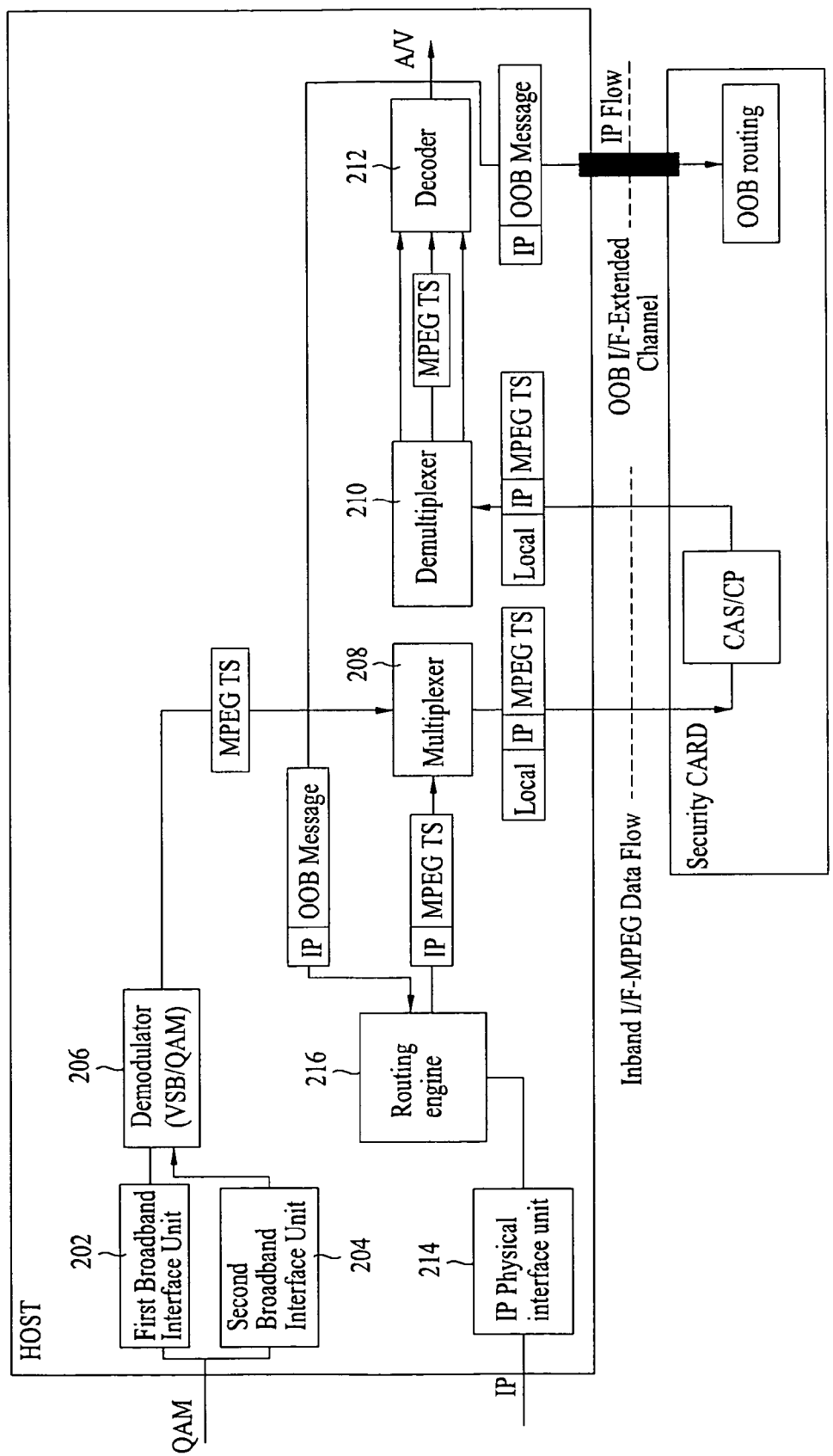
FIG. 6 shows a data flow of the receiver according to a first embodiment of the present invention.
Figure 8:
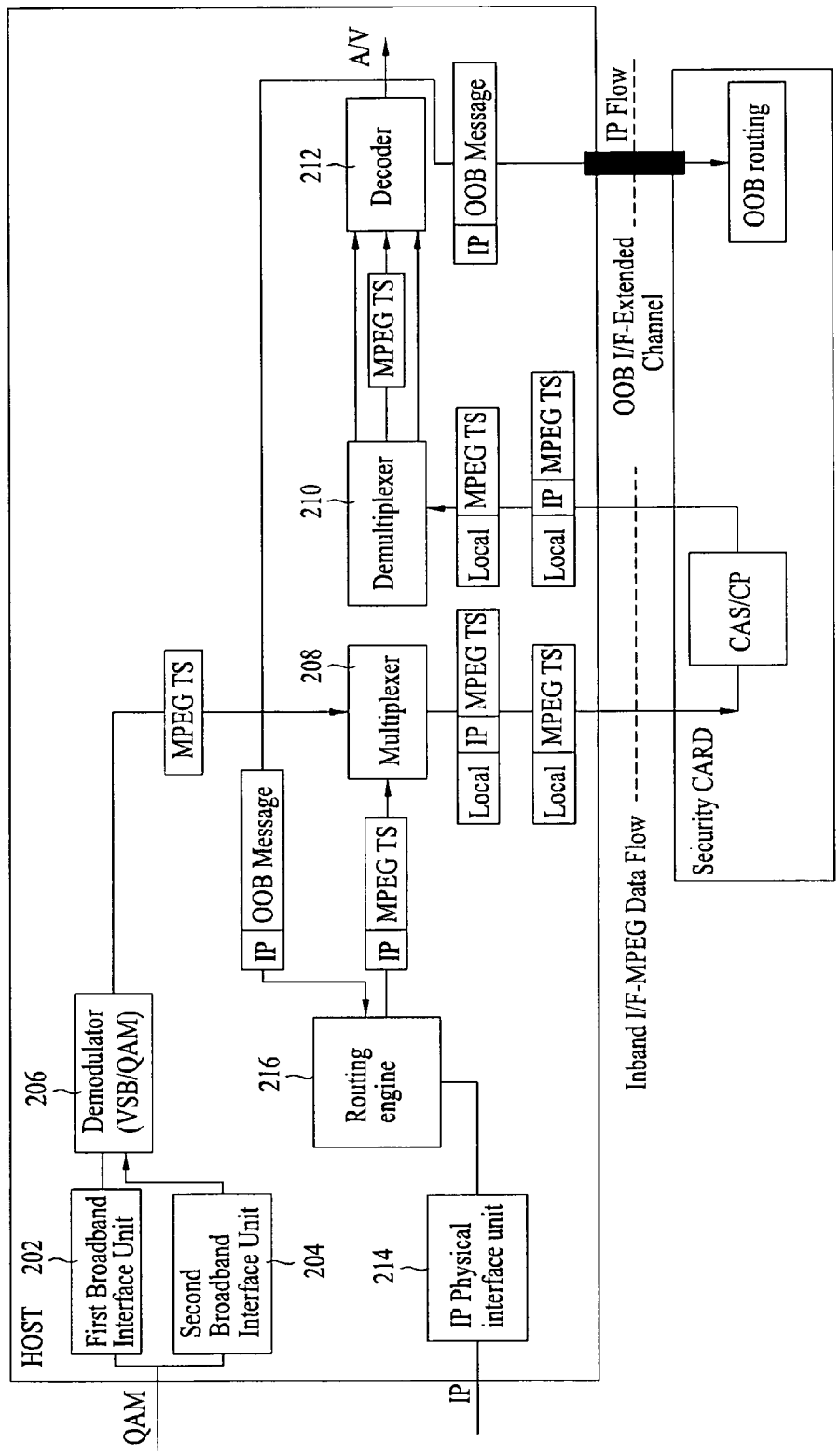
FIG. 8 shows a data flow of the receiver according to a second embodiment of the present invention.

FIG. 6 shows a data flow of the receiver according to a first embodiment of the present invention. The receiver of FIG. 6 is equal to the receiver of FIG. 2. For the convenience of description, it should be noted that the data flow of FIG. 8 is based on the flow of Rx data of the IP network channel and Rx data of the cable broadcast channel, and other blocks will herein be omitted. It is assumed that MPEG-encoded data has been received in the receiver of FIG. 8.

As described above, cable broadcast data can be received via the first broadband interface unit 202 and the second broadband interface unit 204. The received data is QAM-demodulated by the demodulator 206, such that the demodulated data is applied to the multiplexer 208. The output data of the multiplexer 208 has an MPEG-TS format.

IP network channel data is received via the IP physical interface unit (NIC) 214, and the received data is routed to a corresponding destination by the routing engine 216. The routing engine 216 of FIG. 8 shows only the Ethernet layer, the IP layer, and the TCP/UDP layer from among the network stack. The routing engine 216 divides the Rx data into Inband data and OOB data. The OOB data is transmitted to the security card, and the Inband data is transmitted to the multiplexer 208. The transmitted OOB or Inband data is IP packet-format data which includes the IP header, the UDP header (or TCP header) and the payload. In the case of the OOB data, the payload includes the OOB message data. In the case of the Inband data, the payload includes the MPEG TS.

The multiplexer 208 adds the pre-header of 12 bytes to the MPEG-TS data received from the demodulator 206, adds the pre-header of 12 bytes to the IP packet-format data received from the routing engine 216, and transmits the resultant IP packet data to the security card. 'Local' of FIG. 6 is indicative of the pre-header added by the multiplexer 208.

Figure 7:
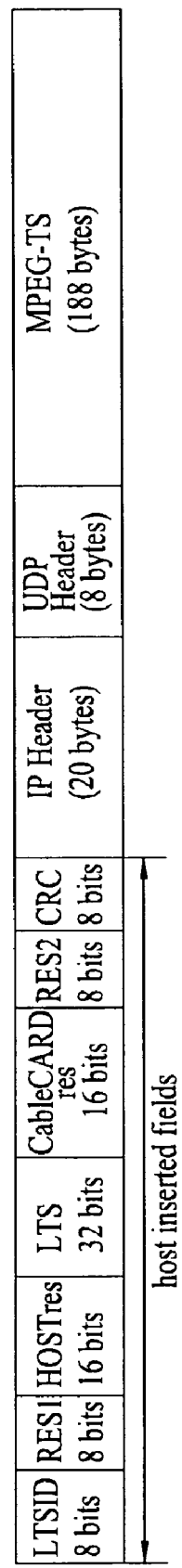
FIG. 7 is a structural diagram illustrating an IMP packet structure according to one embodiment of the present invention.

FIG. 7 is a structural diagram illustrating an IMP packet structure according to one embodiment of the present invention. The IMP packet structure includes a pre-header of 12 bytes, an IP header of 20 bytes, and a UDP (or TCP) header of 8 bytes, and a payload (MPEG-TS) of 188 bytes.

The pre-header of 12 bytes includes a Local Transport Stream ID (LTSID) area, reserved areas (Res1 and Res2), a host reserved area (HOSTres), a Local Time Stamp (LTS) area, a Security CARD reserved area (CableCardres), and a CRC area. The LTSID area may include the above-mentioned LTSID information. The host reserved area (HOSTres) may include additional packet characteristic information generated from the host. The LTS area includes local time stamp (LTS) information prescribed in the host. The host can manage the MPEG packet timing using the above-mentioned local time stamp (LTS) information. The security card reserved area (CableCardres) can be selectively used by the security card. The CRC area includes CRC information for correcting errors of the pre-header.

As described above, the IP packet data received from the routing engine 216 can be formed by the added pre-header of 12 bytes. However, the MPEG-TS data received from the demodulator 206 further requires a dummy IP header and a dummy UDP (or TCP) header to form the above-mentioned IMP packet. Therefore, the multiplexer 208 adds the pre-header to data received from the routing engine 216, adds the pre-header, the dummy IP-header, and the dummy UDP (or TCP) header to the data received from the demodulator 206, such that the IMP packet is formed. The above-mentioned dummy value can be added for the IMP packet format, but it should be noted that the above dummy value can also be used as a reserved area capable of involving other information.

A data channel and an extended channel are located between the security card and the host. The data channel allows control signals to be communicated between the host and the security card. The extended channel allows actual or real data to be communicated between the host and the security card. The data channel and the extended channel are defined to implement data communication between the host and the security card, such that they serve as a CPU interface. In other words, the security card communicates with the transmission end, analyzes a command received from the transmission end, and communicates with the host via the data- and extended-channels, such that the command instructed by the transmission end can be carried out or the user-entry contents can be transmitted to the transmission end.

In this case, in order to transmit data over the extended channel, a transmission path corresponding to a predetermined data type between the security card and the host must be established. This transmission path is called a 'Flow'. For example, in order to transmit MPEG section data, the MPEG section flow must be established between the security card and the host. After the MPEG section flow has been established between the security card and the host, real MPEG section data can be transmitted to a corresponding flow. There are a variety of extended-channel flows between the security card and the host, a DOCSIS Settop Gateway (DSG) flow, an IP unicast (IP_U) flow, an IP multicast (IP_M) flow, and an MPEG section flow. As can be seen from FIG. 6, the OOB message configured in the form of an IP packet can be transmitted to the security card using the IP_U flow or the IP_M flow.

The security card 220 descrambles data contained in the payload of the received IMP packet according to a CAS (Conditional Access System) or CP (Content Protection)

scheme. The resultant IMP-packet including the descrambled data is re-transmitted to the host.

The demultiplexer 210 of the host demultiplexes the received IMP packet, and outputs the demultiplexed IMP packet. Upon receiving the IMP packet, the demultiplexer 210 removes the pre-header from the above packet, and processes data according to the LTSID information. For example, the demultiplexer 210 removes the pre-header, the IP header, and the UDP (or TCP) header from the above packet, and outputs data (MPEG-TS) contained in the payload to the decoder 212. For another example, according to the above-mentioned LTSID information, the IP packet having no pre-header may be stored in the storage unit 230, or only the payload data (MPEG-TS) may be stored in the storage unit 230.

As described above, Tx/Rx data communicated between the host and the security card is unified, such that a simple interface can be implemented and the security card may have a simple logic.

According to a second embodiment of the present invention, the CMP and IMP-format data can be communicated between the host and the security card. In the above example, data received via the cable broadcast channel and another data received via the IP network channel are distinguished from each other, and then data transmission/reception is carried out.

FIG. 8 shows a data flow of the receiver according to a second embodiment of the present invention. The receiver of FIG. 8 is equal to the receiver of FIG. 2.

As described above, the received cable broadcast data has the MPEG-TS format, and is transmitted to the multiplexer 208. IP network channel data is transmitted to the multiplexer 208 via the IP physical interface unit (NIC) 214 and the routing engine 216. The multiplexer 208 adds the pre-header of 12 bytes to the MPEG-TS data received from the demodulator 206, such that it forms the CMP packet. The multiplexer 208 adds the pre-header of 12 bytes to the IP packet data received from the routing engine 216, such that it forms the IMP packet. 'Local' of FIG. 8 is indicative of the pre-header added by the multiplexer 208.

Figure 9:
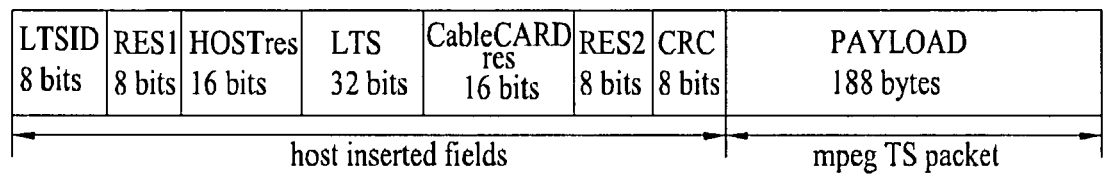
FIG. 9 is a structural diagram illustrating a CableCARD MPEG Packet (CMP) packet structure according to another embodiment of the present invention.
Figure 10:
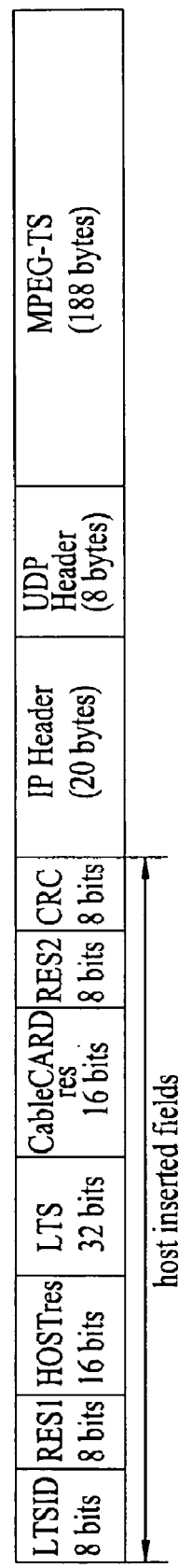
FIG. 10 is a structural diagram illustrating an IMP packet structure according to one embodiment of the present invention.

FIG. 9 is a structural diagram illustrating a CableCARD MPEG Packet (CMP) structure according to one embodiment of the present invention. FIG. 10 is a structural diagram illustrating an IMP structure according to one embodiment of the present invention. The CMP includes a pre-header of 12 bytes and a payload (MPEG-TS) of 188 bytes. The IMP structure includes a pre-header of 12 bytes, an IP header of 20 bytes, and a UDP (or TCP) header of 8 bytes, and a payload (MPEG-TS) of 188 bytes. The aforementioned pre-header information is equal to that of FIG. 7, and the IMP of FIG. 7 is equal to that of FIG. 10.

As can be seen from FIG. 8, the OOB message configured in the form of an IP packet can be transmitted to the security card using the IP_U flow or the IP_M flow. Inband data (e.g., CMP or IMP packet) can be communicated between the security card and the host using the MPEG data flow.

The security card 220 descrambles data contained in the payload of the received CMP- or IMP-packet according to a CAS (Conditional Access System) or CP (Content Protection) scheme. The resultant CMP- or IMP-packet including the descrambled data is re-transmitted to the host.

The demultiplexer 210 of the host demultiplexes the packet received from the security card. If the demultiplexer 210 receives the CMP packet, it may output data (e.g., MPEG-TS) contained in the payload to the decoder 212 or store the same in the storage unit 230 according to LTSID information contained in the pre-header.

If the demultiplexer 210 receives the IMP packet, it may output data (e.g., MPEG-TS) contained in the payload to the decoder 212 or store the same in the storage unit 230 according to LTSID information contained in the pre-header. Otherwise, the IP packet having no pre-header may also be stored in the storage unit 230.

In this case, the demultiplexer 210 of the host and the security card 20 must discriminate between the CMP packet and the IMP packet. In order to discriminate between the CMP packet and the IMP packet, the security card 220 and the demultiplexer 210 may use a variety of schemes.

Firstly, the present invention may use a method for identifying the above packet using a Start Of Packet (SOP) such as MPEG-TS contained in the payload. If the security card 220 receives the packet from the host, it determines whether the received packet is equal to the CMP packet. If it is determined that the received packet is not equal to the CMP packet, the security card 220 determines whether the received packet is the IMP packet. Otherwise, according to an implementation example, the security card 220 may firstly determine whether the received packet is the IMP packet.

That is, the security card 220 shifts a current position by 12 bytes corresponding to the pre-header size on the basis of a first byte of the received packet, such that it determines whether the value of a 13-th byte is indicative of a SOP. For example, if the MPEG-TS is used, the SOP value is set to '0x47'. Therefore, if the 13-th byte value is indicative of the SOP value, the security card 220 determines the received packet to be the CMP.

If the CMP is not determined, the security card 220 shifts a current position by 40 bytes corresponding to the size of the pre-header, the IP-header, and the UDP (or TCP) header on the basis of the first byte, such that it determines whether the value of a 41-th byte is a SOP. If the 41-th byte value is determined to be the SOP, the security card 220 determines that the received packet to be the IMP. The above-mentioned scheme can also be used to allow the demultiplexer 210 of the host to identify the packet.

Secondly, the present invention may use a method for identifying the above packet using the reserved area contained in the pre-header of the above packet. For example, the multiplexer 208 inserts identification information for identifying the above packet in the reserved area contained in the pre-header of the CMP or IMP, such that it transmits the resultant packet to the security card 220.

The pre-header of 12 bytes includes a Local Transport Stream ID (LTSID) area, reserved areas (Res1 and Res2), a host reserved area (HOSTres), a Local Time Stamp (LTS) area, a Security CARD reserved area (CableCardres), and a CRC area. The multiplexer 208 inserts packet identification information into at least one of the Res1, Res2, HOSTres, CableCardres areas. For example, the multiplexer 208 adds the pre-header to data received from the demodulator 206, and converts the added result to the CMP packet. In this case, the CMP packet identification information is inserted into the reserved area of the pre-header. The data received from the routing engine 216 is converted into the IMP packet, and the IMP packet identification information is inserted into the reserved area of the pre-header. The position of the above-mentioned reserved area in which the above packet identification information is inserted may be changed to another according to implementation examples.

The following table 1 is acquired when the packet identification information (Packet ID) of 2 bytes is inserted into the HOSTres area. In case of the CMP packet, the packet ID field value of the HOSTres area is set to '0x01'. In case of the IMP packet, the packet ID field value is set to '0x02'.

TABLE 1

| Packet ID value | Description |
| --- | --- |
| 0x01 | CMP (CableCard MPEG Packet) |
| 0x02 | IMP (IP MPEG Packet) |
| 0x03~0xFF | reserved for future use |

The demultiplexer 210 of the host and the security card 220 can identify the received packet using the packet identification information contained in the above pre-header. Otherwise, the security card 220 and the demultiplexer 210 can transmit/receive data in units of the length of a corresponding packet using the above-mentioned identification information. Although other kinds of packets are defined, the scope of the present invention can be easily extended by the above-mentioned identification information. Also, the present invention can effectively support the interface between the security card and the host in association with packets of different A/V types.

Thirdly, the present invention may use a method for identifying the above packet using Tx/Rx signals of the above packet. For example, a first signal indicating a start part of the packet and a second signal indicating the end part of the packet are communicated between the security card and the host in order to identify the packet.

Figure 11A:
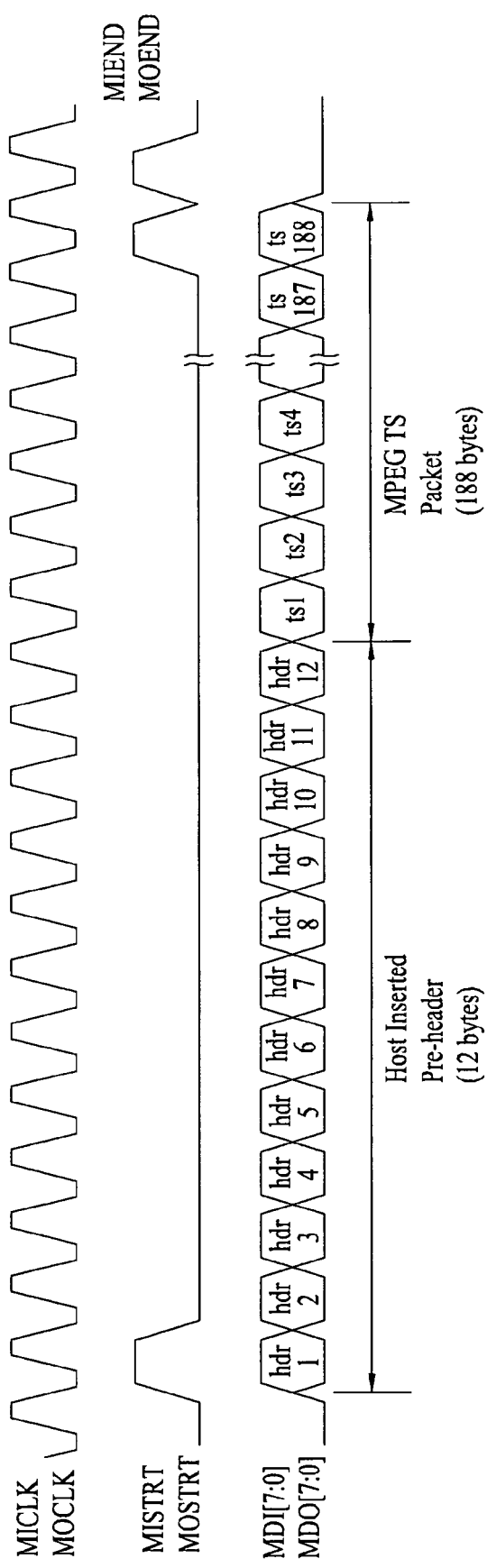
FIGS. 11A and 11B show a start signal and an end signal of the packet according to one embodiment of the present invention.
Figure 11B:
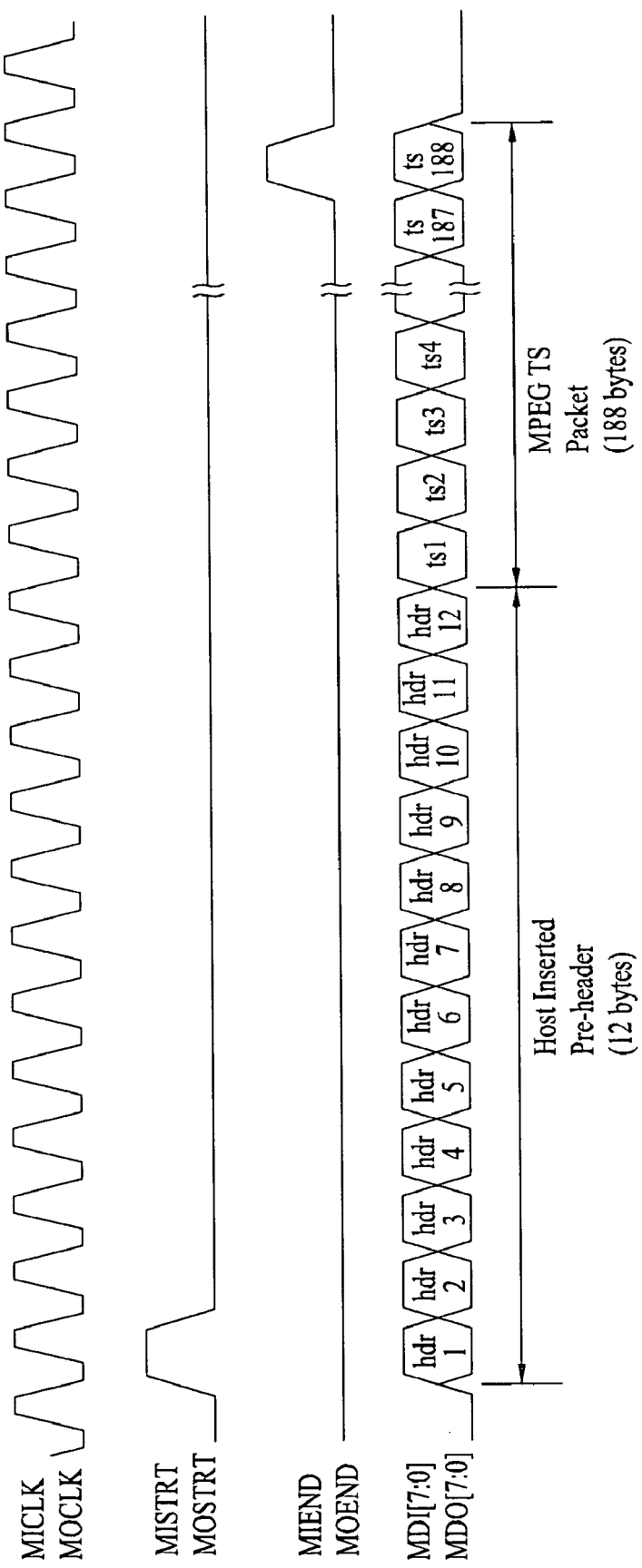

FIGS. 11A and 11B show a start signal and an end signal of the packet according to one embodiment of the present invention. 'MICLK' is indicative of an MPEG transfer stream clock signal transmitted from the host to the card under the multistream mode. 'MOCLK' is indicative of an MPEG transfer stream clock signal transmitted from the card to the host under the multi-stream mode. 'MISTRT' is indicative of a signal indicating the beginning of the packet transmitted from the host to the card. 'MIEND' is indicative of a signal indicating the end of the packet transmitted from the host to the card. 'MOSTRT' is indicative of a signal indicating the beginning of the packet transmitted from the host to the card. 'MOEND' is indicative of a signal indicating the end of the packet transmitted from the host to the card. "MDI" is indicative of an MPEG transfer stream input data bus transmitted from the host to the card. 'MDO' is indicative of an MPEG transfer stream output data bus transmitted from the card to the host. The above-mentioned signals may act as control signals communicated between the host and the security card, and may be communicated via the controller. However, the above-mentioned terms have been disclosed for only illustrative purposes, and the scope of the present invention is not limited to only the above terms, but can also be applied to other examples as necessary.

'MDI' data and 'MISTRT' signal clock are applied from the rising edge of the 'MICLK' clock to the card. 'MDO' data and 'MOSTRT' signal clock are applied from the rising edge of the 'MOCLK' clock to the host. Input data of the 'MISTRT' clock signal and either the CMP packet of 200 bytes (i.e., pre-header of 12 bytes+MPEG TS of 188 bytes) or the IMP packet of 200 bytes (i.e., pre-header of 12 bytes+IP header of 20 bytes+UDP (or TCP) header of 8 bytes+MPEG TS of 188 bytes) are transmitted from the host to the card. When the last byte of the above packet is transmitted to the security card, the 'MIEND' clock signal can be transmitted to the security card. Therefore, the security card counts the number of bytes of Rx data located between the 'MISTRI' signal and the 'MIEND' signal or the number of 'MICLK' clocks, such that it can identify the packet type according to the counted result. By the above-mentioned method, the demultiplexer 210 of the host can identify the packet type using the 'MOSTRT' and 'MOEND' signals.

Also, when a first byte of the above packet payload is transmitted to the security card, the 'MIEND' clock signal can be transmitted to the security card. Therefore, the security card counts the number of bytes of Rx data located between the 'MISTRI' signal and the 'MIEND' signal or the number of 'MICLK' clocks, such that it can identify the packet type according to the counted result. By the above-mentioned method, the demultiplexer 210 of the host can identify the packet type using the 'MOSTRT' and 'MOEND' signals. In more detail, if the number of bytes of Rx data between the 'MISTRI' signal and the 'MIEND' signal is 13, the security card can recognize that the received packet is the CMP packet. If the number of bytes of Rx data between the 'MISTRI' signal and the 'MIEND' signal is 41, the security card can recognize that the received packet is the IMP packet.

Based on the conventional 'MISTRT' and 'MOSTRT' signal system of FIG. 11A, if a single clock signal is received, the 'MIEND' and 'MOEND' signals can be recognized as 'MISTRT' and 'MOSTRT' signals, respectively. If several clock signals are received, the 'MIEND' and 'MOEND' signals can be recognized as 'MIEND' and 'MOEND' signals, respectively. Otherwise, the MIEND or MOEND clock signal can also be transmitted/received independent of the conventional MISTRT and MOSTRT signal system. If different signal systems are applied to the Tx start signal and the Tx end signal as shown in FIG. 11B, there is no need to discriminate between clock signals. However, if the same signal system is used as shown in FIG. 11A, the present invention must discriminate between the Tx start signal and the Tx end signal.

By the above-mentioned methods, the present invention can easily identify the packet type although different kinds of packets are defined. Also, if a hardware design is slightly modified, the present invention can effectively support the interface between the security card and the host in association with packets of different A/V types.

Figure 12:
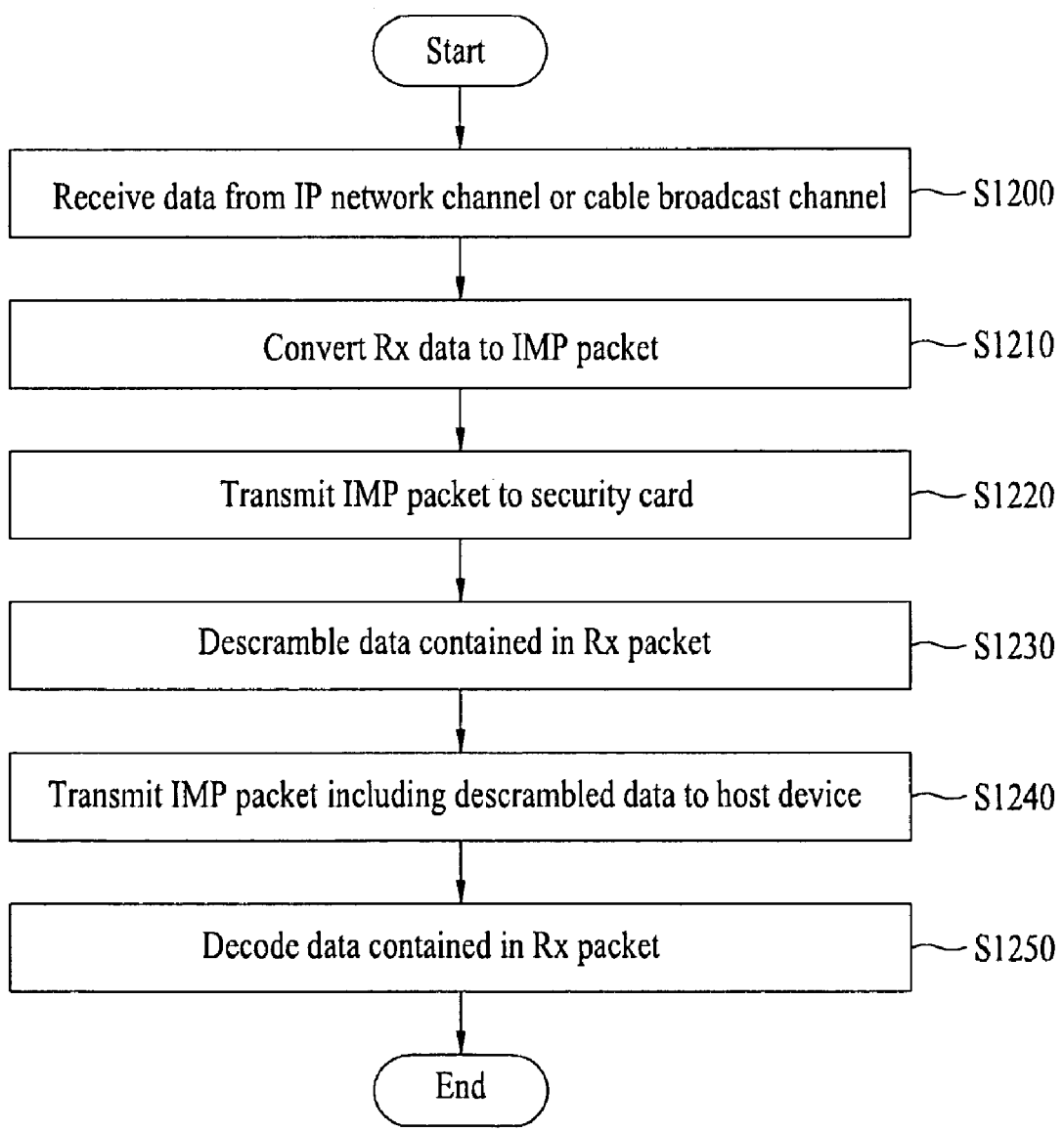
FIG. 12 is a flow chart illustrating a method for processing Rx data according to one embodiment of the present invention.

FIG. 12 is a flow chart illustrating a method for processing Rx data according to one embodiment of the present invention. FIG. 12 shows a method for converting Rx data of the cable broadcast channel and Rx data of the IP network channel into the IMP packet and then transmitting/receiving the IMP packet.

As described above, the host of the receiver may receive A/V data via the IP network channel and the cable broadcast channel at step S1200. The host may simultaneously receive the above data from the IP network channel and the cable broadcast channel, or may receive the above data from either one of the IP network channel and the cable broadcast channel.

As described above, the host converts the Rx data into the IMP packet, and multiplexes the IMP packet at step S1210. In this case, the pre-header of 12 bytes is added to the Rx data of the IP network channel, and the pre-header of 12 bytes, the dummy IP header, and the dummy UDP (or TCP) header may be added to the Rx data of the cable broadcast channel. In this case, the LTSID may be inserted into the pre-header of the IMP packet.

The IMP packet is transmitted to the security card at step S1220. The security card descrambles data contained in the payload of the received packet at step S1230. The security card re-transmits the IMP packet including the descrambled data to the host at step S1240.

The host decodes data contained in payload of the IMP packet received from the security card at step 1250. Otherwise, the host may store the descrambled data of the above payload or may store the IP packet having no pre-header.

Figure 13:
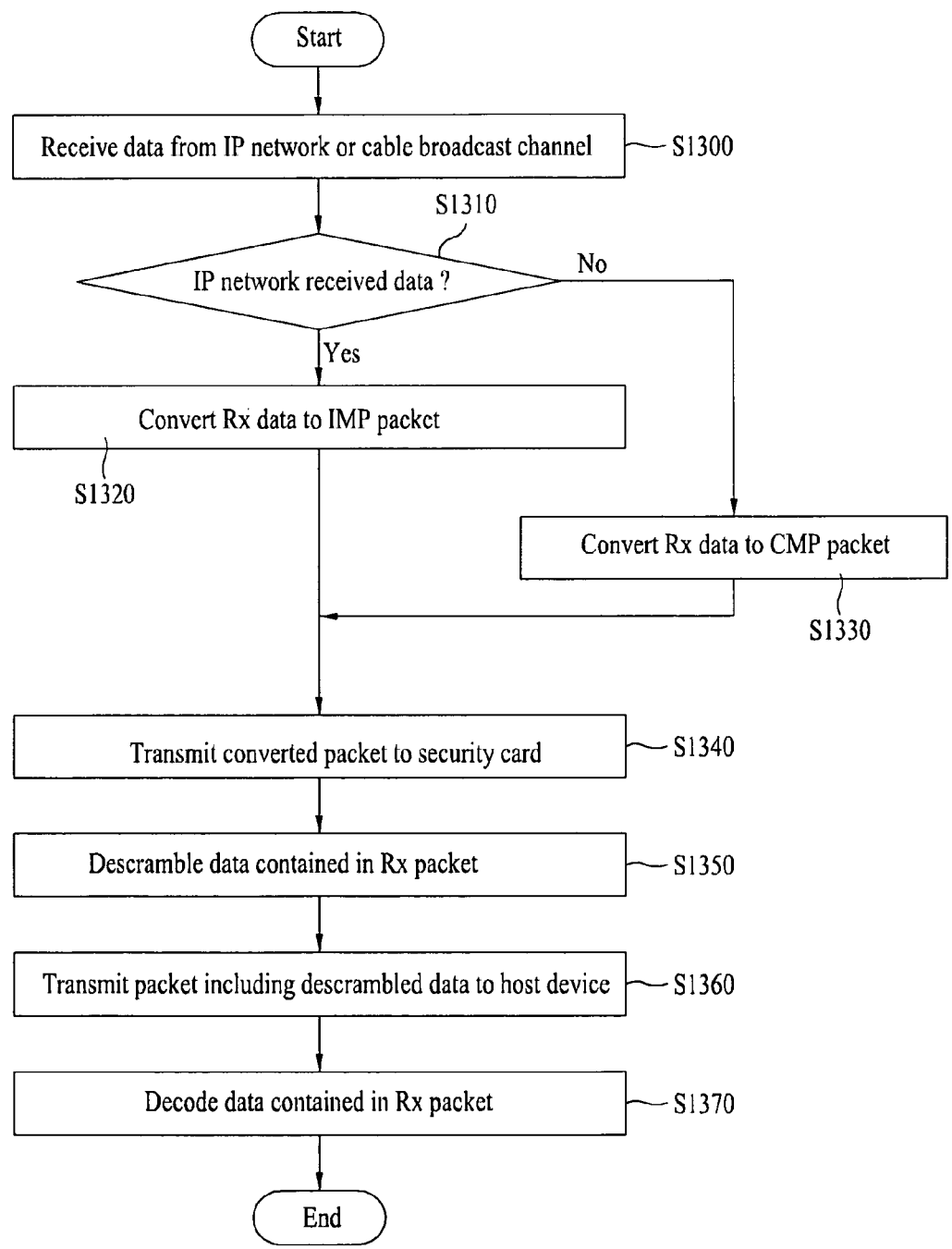
FIG. 13 is a flow chart illustrating a method for processing Rx data according to another embodiment of the present invention.

FIG. 13 is a flow chart illustrating a method for processing Rx data according to another embodiment of the present invention. FIG. 13 shows a method for converting Rx data of the cable broadcast channel into the CMP packet, converting Rx data of the IP network channel into the IMP packet, and transmitting/receiving the CMP and IMP packets.

As described above, the host of the receiver may receive A/V data via the IP network channel and the cable broadcast channel at step S1300. The host may simultaneously receive the above data from the IP network channel and the cable broadcast channel, or may receive the above data from either one of the IP network channel and the cable broadcast channel.

If the received data is determined to be data received via the IP network channel at step S1310, the host converts the received data is converted into the IMP packet at step S1320. Otherwise, if the received data is determined to be data received via the cable broadcast channel, the host converts the received data is converted into the CMP packet at step S1330. In this case, the LTSID may be inserted into the pre-header of the IMP or CMP packet.

The IMP or CMP packet is transmitted to the security card at step S1340. The security card discriminates the received packet, and descrambles data contained in the payload of the received packet at step S1350. In order to discriminate the above packet, the present invention may use SOP (Start Of Packet) information, Packet ID contained in the packet pre-header, or the start and end signals of the packet according to a variety of implementation examples.

The security card re-transmits the CMP or IMP packet including the descrambled data to the host at step S1360. The host decodes data contained in the IMP or CMP packet payload received from the security card at step S1370. Otherwise, the host may store the descrambled data of the above payload or may store the IP packet having no pre-header.

Although the above-mentioned embodiments have exemplarily used the security card, the smart card may also be used, instead of the security card.

According to this embodiment of the present invention, a descramble module is contained in the security card or the smart card. The card is detachably connected to the host. The Rx broadcast signal is descrambled by the descramble module of the card, and the descrambled result is provided to the user. However, according to some embodiments of the present invention, the host may include a descramble module without the card. The descramble module may be modified to be downloaded from a broadcast station or a service provider. In other words, the downloaded descramble module may be modified to be stored in a predetermined memory contained in the host. However, the above-mentioned structures have been disclosed for only illustrative purposes, and it should be noted that the above-mentioned structural difference does not limit the spirit or scope of the present invention and can also be implemented with other examples as necessary.

As apparent from the above description, the present invention can perform content protection using the conditional access provided from the conventional cable card. Therefore, the service provider or the service enterpriser can perform the above content protection, and can stably charges a usage fee to a service user using the conditional access.

The present invention processes broadcast data received from all the transfer protocols including both the wired/wireless network and the IP protocol, such that it interfaces with the openCable security card. A service subscriber or a service user minimally changes or extends a function of the conventional cable security card, such that the subscriber or user is able to view data of a desired service provider.

The present invention allows Inband data, transmitted on all the transfer protocols including the wired/wireless network and the IP protocol, to maintain the IP packet format, such that IP-packet format Inband data is transmitted to the security card. As a result, the host can effectively communicate with the security card.

The present invention maintains the interface of the Inband interface of the conventional openCable card, such that it can support both the Inband data received over the Internet or other Inband data received over other Inband channels. As a result, the present invention can acquire a backward compatibility with a conventional system.

The present invention receives not only first Inband data transmitted on all the transfer protocols including the wired/wireless network and the IP protocol, but also second Inband data based on another Rx scheme, and implements the interface between the host and the card under the data structure based on the same IP packet, such that it can effectively process Inband data having various transmission schemes and paths.

The present invention can receive broadcast data from a multimedia over Coax Alliance (MoCA), such that an seamless IP-based connectivity can be implemented on a coaxial network, resulting in the implementation of an IP over Coax.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of processing broadcast data, the method comprising:
   receiving a frame including an internet protocol (IP) packet through a network and a MPEG transport packet through a cable;
   extracting the IP packet from the frame and routing the extracted IP packet based on a destination information included in the frame;
   generating an IP MPEG packet and a CableCARD MPEG packet by appending a Packet Header carrying identification information and packet identification information to each of the routed IP packet and the MPEG transport packet; and
   multiplexing the IP MPEG packet and the CableCARD MPEG packet and sending the multiplexed IP MPEG packet and CableCARD MPEG packet to a point of deployment (POD),
   wherein the packet identification information is information for identifying the IP MPEG packet or the CableCARD MPEG packet, and the routed IP packet includes a MPEG transport packet.

2. The method of claim 1, wherein the destination information is at least one of a MAC address, an IP address and a Port Number.

3. The method of claim 1, wherein the frame is an Ethernet frame including an Ethernet header, an IP packet and an Ethernet CRC.

4. The method of claim 3, wherein extracting the IP packet from the frame comprises:
   removing the Ethernet header and the Ethernet CRC from the frame.

5. The method of claim 1, wherein generating IP MPEG packet comprises:
   determining the identification information with respect to the IP packet.

6. The method of claim 5, wherein the identification information is determined based on at least one of an IP address and a Port number included in the IP packet.

7. The method of claim 1, wherein the identification information is a local transport stream ID (LTSID).

8. The method of claim 1, further comprises:
receiving a packet from the POD and detecting whether the received packet is an IP MPEG packet or a CableCARD MPEG packet based on packet identification information included in the packet.

9. The method of claim 1, wherein the IP packet carries at least one of a video, an audio and a service information.

10. A method of processing broadcast data, the method comprising:
receiving a packet from a host;
detecting whether the received packet is an IP MPEG packet or a CableCARD MPEG packet based on packet identification information included in the packet;
descrambling data carried within a payload field included in the detected packet; and
sending the packet to the host,
wherein the packet identification information is information for identifying the IP MPEG packet or the CableCARD MPEG packet, and the IP MPEG packet includes an IP packet including a MPEG transport packet.

11. The method of claim 10, wherein the packet identification information is carried within Packet Header included in the packet.

12. A host device interfacing with a point of deployment (POD), the host device comprising:
a broadband interface unit configured to receive a MPEG transport packet through a cable;
an IP physical interface unit configured to receive a frame including an internet protocol (IP) packet through a network;
a routing engine configured to extract the IP packet from the frame and route the extracted IP packet based on a destination information included in the frame; and
a multiplexer configured to generate IP MPEG packet and CableCARD MPEG packet by appending a Packet Header carrying identification information and packet identification information to each of the routed IP packet and the MPEG transport packet, multiplex the IP MPEG packet and the CableCARD MPEG packet, and send the multiplexed IP MPEG packet and CableCARD MPEG packet to the POD,
wherein the packet identification information is information for identifying the IP MPEG packet or the CableCARD MPEG packet, and the routed IP packet includes a MPEG transport packet.

13. The host of claim 12, wherein the destination information is at least one of a MAC address, an IP address and a Port Number.

14. The host of claim 12, wherein the frame is an Ethernet frame including an Ethernet header, an IP packet and an Ethernet CRC.

15. The host of claim 14, wherein the routing engine removes the Ethernet header and the Ethernet CRC from the frame.

16. The host of claim 12, wherein the multiplexer determines the identification information with respect to the IP packet.

17. The host of claim 16, wherein the multiplexer determines the identification information based on at least one of an IP address and a Port number included in each of the IP packet.

18. The method of claim 12, wherein the IP packet carries at least one of a video, an audio and a service information.

19. The host of claim 12, wherein the identification information is a local transport stream ID (LTSID).

20. The host of claim 12, wherein further comprises:
a demultiplexer configured to receive a packet from the POD and detect whether the received packet is an IP MPEG packet or a CableCARD MPEG packet based on packet identification information included in the packet.

* * * * *